(12) United States Patent
Byun

(10) Patent No.: US 9,093,699 B2
(45) Date of Patent: Jul. 28, 2015

(54) RECHARGEABLE BATTERY

(75) Inventor: Sangwon Byun, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 669 days.

(21) Appl. No.: 12/926,634

(22) Filed: Dec. 1, 2010

(65) Prior Publication Data

US 2011/0300435 A1    Dec. 8, 2011

(30) Foreign Application Priority Data

Jun. 4, 2010 (KR) .................. 10-2010-0052885

(51) Int. Cl.
*H01M 2/30* (2006.01)
*H01M 2/06* (2006.01)

(52) U.S. Cl.
CPC . *H01M 2/30* (2013.01); *H01M 2/06* (2013.01)

(58) Field of Classification Search
None
See application file for complete search history.

(56) References Cited

U.S. PATENT DOCUMENTS 6,521,374 B1 * 2/2003 Nakanishi et al. ............ 429/178
6,579,640 B1 * 6/2003 Nagase et al. .................. 429/54

FOREIGN PATENT DOCUMENTS

| JP | 2000-048803 A | 2/2000 |
| JP | 2000-311664 A | 11/2000 |
| JP | 2009-252395 A | 10/2009 |
| KR | 10 1997-0054913 A | 7/1997 |

* cited by examiner

*Primary Examiner* — Alix Eggerding
(74) *Attorney, Agent, or Firm* — Lee & Morse, P.C.

(57) ABSTRACT

A rechargeable battery includes an electrode assembly, the electrode assembly including a first electrode plate, a second electrode plate, and a separator interposed between the first electrode plate and the second electrode plate, a first collector plate, a case in which the electrode assembly is received, a cap plate sealing the case, a first electrode terminal electrically connected to the first electrode plate, the first electrode terminal including a first terminal bolt electrically connected to the first collector plate and passing through the cap plate, and a first terminal nut, the first terminal nut being engaged with the first terminal bolt so as to be riveted thereto.

13 Claims, 4 Drawing Sheets

RECHARGEABLE BATTERY

BACKGROUND

1. Field

Embodiments relate to a rechargeable battery.

2. Description of the Related Art

A secondary battery is capable of being charged and discharged. A low-capacity secondary battery having a single battery cell may be used as a power source for various small portable electronic devices, such as cellular phones and camcorders. A high-capacity secondary battery, in which a plurality of battery cells are connected to each other in a pack structure, may be used as a power source for driving, e.g., a motor of a hybrid electric vehicle.

Secondary batteries may be manufactured in various shapes. Secondary batteries may be generally classified as a cylindrical shape battery or a prismatic shape battery.

SUMMARY

It is a feature of an embodiment to provide a rechargeable battery capable of coupling to an external bus bar and improving reliability of an electrode terminal.

At least one of the above and other features and advantages may be realized by providing a rechargeable battery, including an electrode assembly, the electrode assembly including a first electrode plate, a second electrode plate, and a separator interposed between the first electrode plate and the second electrode plate, a first collector plate, a case in which the electrode assembly is received, a cap plate sealing the case, a first electrode terminal electrically connected to the first electrode plate, the first electrode terminal including a first terminal bolt electrically connected to the first collector plate and passing through the cap plate, and a first terminal nut, the first terminal nut being engaged with the first terminal bolt so as to be riveted thereto.

The first terminal bolt may be made of copper.

An upper part of the first terminal bolt may have a nickel coating.

The first terminal bolt may include a thread on an outer circumferential surface thereof.

The first terminal nut may include a thread on an inner surface thereof, the thread of the first terminal nut being engaged with the thread on the first terminal bolt.

The first terminal bolt may include a rivet recess at a top end thereof.

The first terminal bolt may include an extension part at an outer circumference of the rivet recess.

The first terminal nut may include a receiving part at an interior upper part thereof, the extension part of the first terminal bolt being coupled to the receiving part.

The first terminal nut may be made of aluminum.

The rechargeable battery may further include a second collector plate, a second electrode terminal electrically connected to the second electrode plate, the second electrode terminal including a second terminal bolt electrically connected to the second collector plate and passing through the cap plate, and a second terminal nut, the second terminal nut being engaged with the first terminal bolt so as to be riveted thereto.

The second terminal bolt may be made of aluminum.

The second terminal bolt may include a thread on an outer circumferential surface thereof.

The second terminal nut may include a thread on an inner surface thereof, the thread of the second terminal nut being engaged with the thread on the second terminal bolt.

The second terminal bolt may include a rivet recess at a top end thereof.

The second terminal bolt may include an extension part at an outer circumference of the rivet recess.

The second terminal nut may include a receiving part at an interior upper part thereof, the extension part of the second terminal bolt being coupled to the receiving part.

The second terminal nut may be made of aluminum.

BRIEF DESCRIPTION OF THE DRAWINGS

The above and other features and advantages will become more apparent to those of skill in the art by describing in detail example embodiments with reference to the attached drawings, in which:

FIG. 3B illustrates a cross-sectional view of the first terminal bolt shown in

FIG. 3A, the first terminal bolt being riveted;

DETAILED DESCRIPTION

Figure 1:
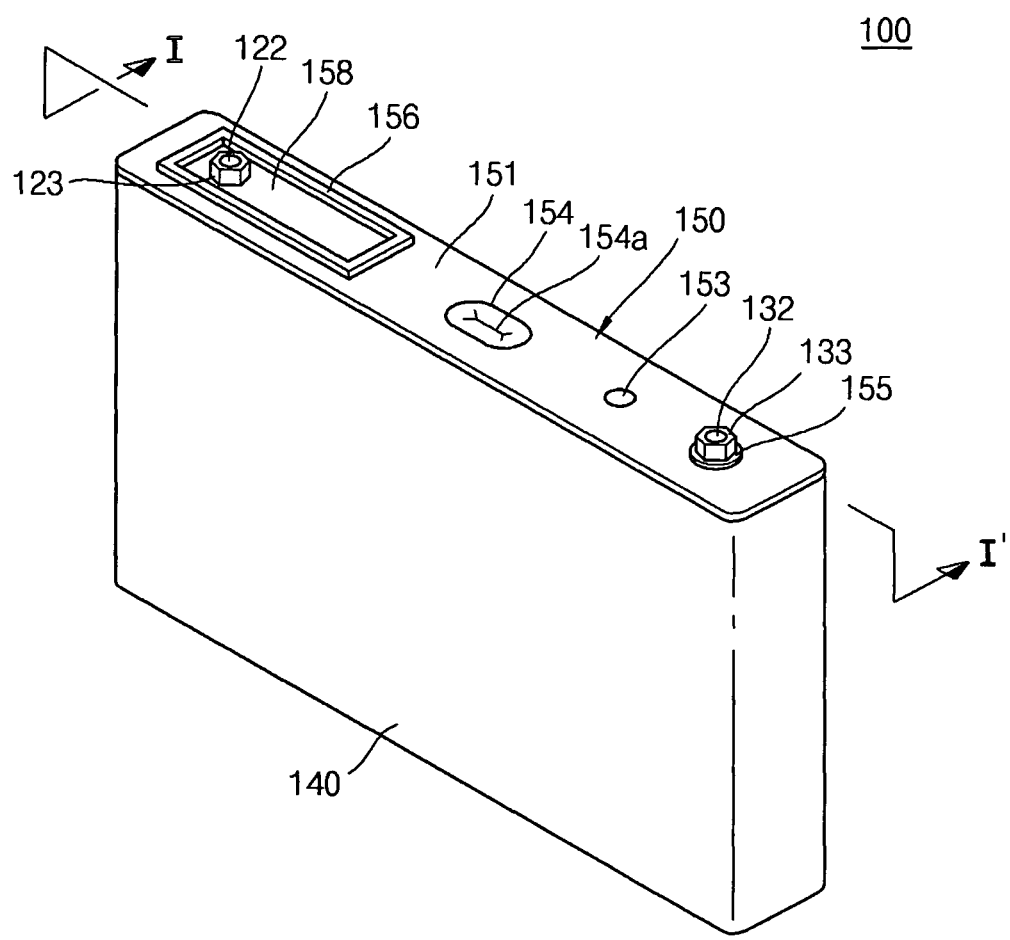
FIG. 1 illustrates a perspective view of a rechargeable battery according to a first example embodiment.

Korean Patent Application No. 10-2010-0052885, filed on Jun. 4, 2010, in the Korean Intellectual Property Office, and entitled "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
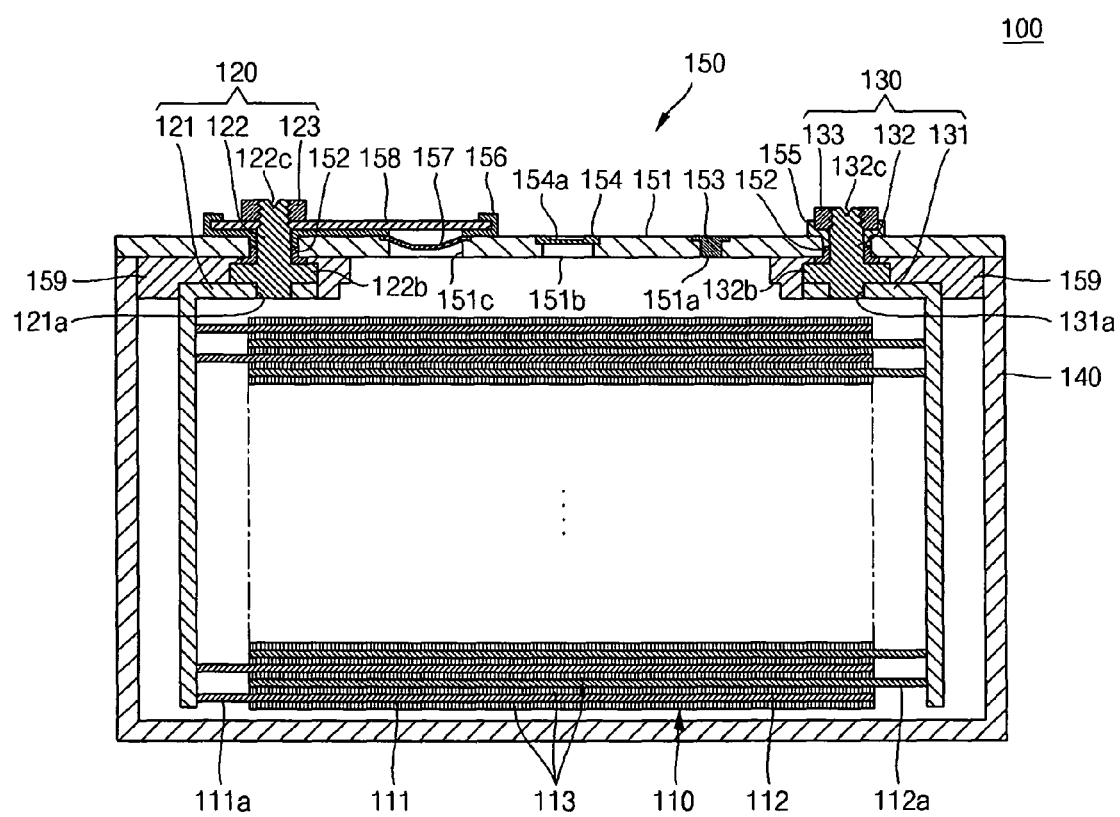
FIG. 2 illustrates a cross-sectional view of the rechargeable battery, taken along the line I-I' of FIG. 1.
Figure 3A:
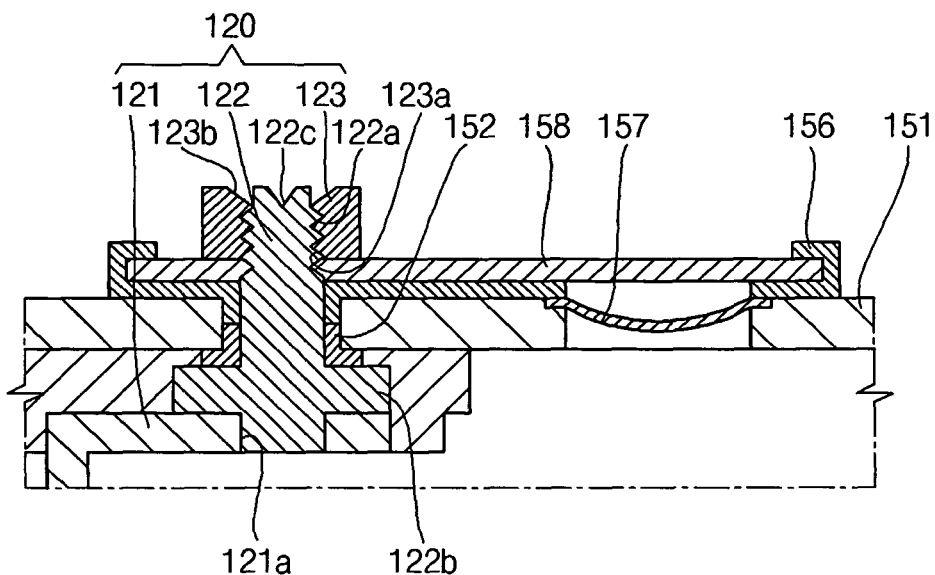
FIG. 3A illustrates a cross-sectional view of a first terminal nut engaged with a first terminal bolt.
Figure 3B:
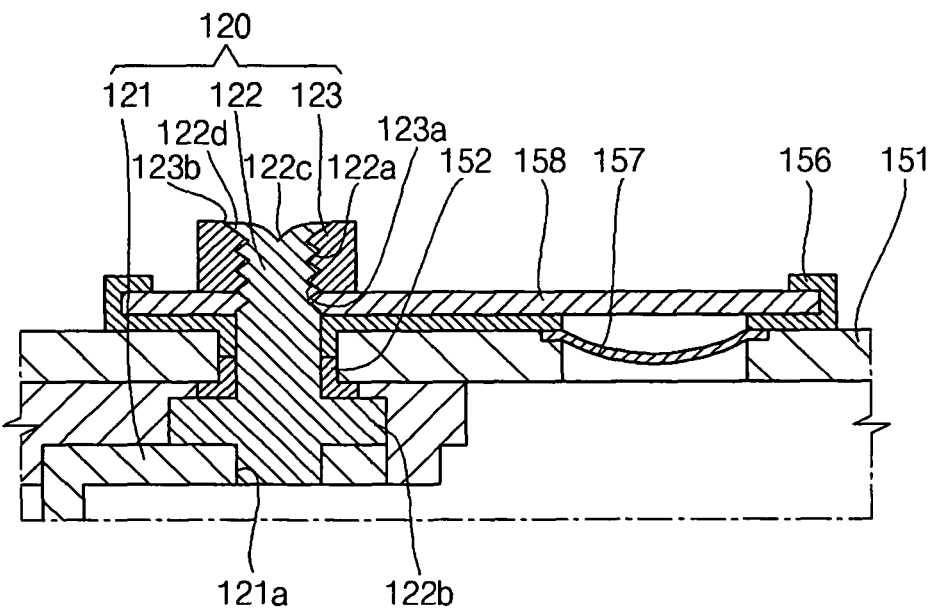
Figure 4A:
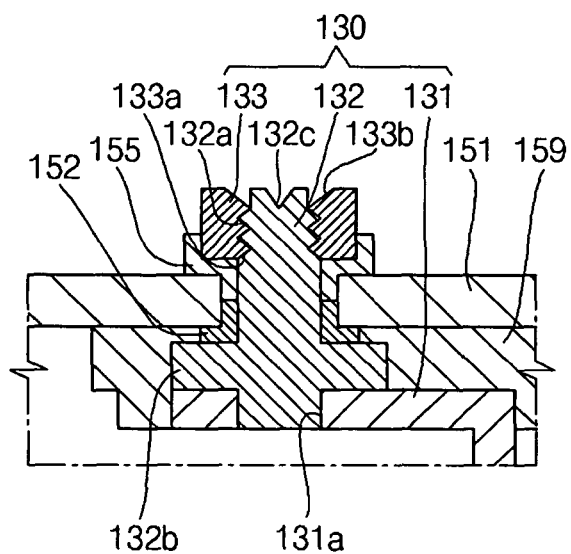
FIG. 4A illustrates a cross-sectional view of a second terminal nut engaged with a second terminal bolt.
Figure 4B:
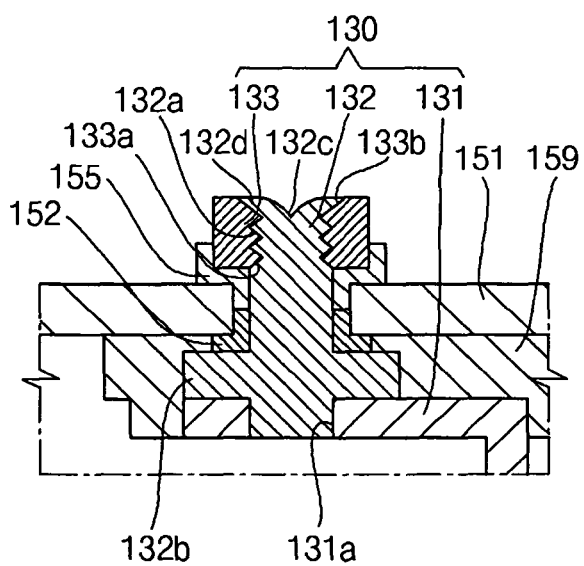
FIG. 4B illustrates a cross-sectional view of the second terminal bolt shown in FIG. 4A, the second terminal bolt being riveted.

FIG. 1 illustrates a perspective view of a rechargeable battery according to a first example embodiment, FIG. 2 illustrates a cross-sectional view of the rechargeable battery, taken along the line I-I' of FIG. 1, FIG. 3A illustrates a cross-sectional view of a first terminal nut engaged with a first terminal bolt, FIG. 3B illustrates a cross-sectional view of the first terminal bolt shown in FIG. 3A, the first terminal bolt being riveted, FIG. 4A illustrates a cross-sectional view of a second terminal nut engaged with a second terminal bolt, and FIG. 4B illustrates a cross-sectional view of the second terminal bolt shown in FIG. 4A, the second terminal bolt being riveted.

In the example embodiment shown in FIGS. 1 through 4B, the rechargeable battery 100 includes an electrode assembly 110, a first electrode terminal 120, a second electrode terminal 130, a case 140, and a cap plate 150.

The electrode assembly 110 may be formed by winding or folding a stacked structure, the stacked structure including a first electrode plate 111 shaped of a thin plate or foil, a second electrode plate 112, and a separator 113 interposed between the first electrode plate 111 and the second electrode plate 112. The first electrode plate 111 may be a positive electrode, and the second electrode plate 112 may be a negative electrode.

The first electrode plate 111 may be formed by coating a first electrode active material, e.g., a transition metal oxide, on a first electrode collector, which may be made of a metal foil such as aluminum (Al). The first electrode plate 111 may include a first electrode uncoated portion 111a that is not coated with the first electrode active material. The first electrode uncoated portion 111a may provide a current flow path between the first electrode plate 111 and the outside of the first electrode plate 111.

The second electrode plate 112 may be formed by coating a second electrode active material, e.g., graphite or a carbon material, on a second electrode collector, which may be made of a metal foil such as nickel (Ni) or copper (Cu). The second electrode plate 112 may include a second electrode uncoated portion 112a that is not coated with the second electrode active material. The second electrode uncoated portion 112a may provide a current flow path between the second electrode plate 112 and the outside of the second electrode plate 112.

In another implementation, the first electrode plate 111 and the second electrode plate 112 may be arranged by reversing their polarities.

The separator 113 may be positioned between the first electrode plate 111 and the second electrode plate 112 to prevent an electrical short therebetween while allowing for movement of ions, e.g., lithium ions. The separator 113 may be formed of, e.g., polyethylene (PE), polypropylene (PP), a composite film of PE and PP, etc.

A first electrode terminal 120 and a second electrode terminal 130 may be coupled to both ends of the electrode assembly 110 to be electrically connected to the first electrode plate 111 and the second electrode plate 112, respectively.

The electrode assembly 110 may be received in the case 140 together with an electrolyte (not shown). The electrolyte may include, e.g., an organic solvent such as ethylene carbonate (EC), propylene carbonate (PC), ethyl methyl carbonate (EMC), dimethyl carbonate (DMC), or the like, and a salt, e.g., a lithium salt such as lithium hexafluorophosphate (LiPF$_6$), lithium tetrafluoroborate (LiBF$_4$), or the like. The electrolyte may be in a liquid, solid, or gel phase.

The first electrode terminal 120 may be made of a conductive material such as aluminum, and may be electrically connected to the first electrode plate 111. The first electrode terminal 120 may include a first collector plate 121, a first terminal bolt 122, and a first terminal nut 123.

The first collector plate 121 may be electrically connected to the first electrode uncoated portion 111a protruding to an end of the electrode assembly 110. The first collector plate 121 may be formed in an inverted shape and may have a terminal hole 121a at its upper part. The first terminal bolt 122 may be fitted into the terminal hole 121a to then be engaged with the first collector plate 121. The first terminal bolt 122 may pass through a cap plate 151, which is described below, and may be electrically connected to the first collector plate 121.

The first terminal bolt 122 may include a thread 122a formed on an outer circumferential surface of an upper part of the first terminal bolt 122 shaped as a column. The first terminal bolt 122 may also include a flange 122b formed at a lower part of the columnar-shaped part of the first electrode terminal 122, the flange 122b being positioned below the cap plate 151, so as to prevent the first terminal bolt 122 from being disengaged from the cap plate 151. A portion of the first terminal bolt 122 positioned lower than the flange 122b may be fitted into the first terminal hole 121a of the first collector plate 120. The first terminal bolt 122 may be electrically isolated from the cap plate 151.

Referring to FIGS. 3A and 3B, a rivet recess 122c may be formed at an upper end of the first terminal bolt 122 to allow the first terminal bolt 122 to be riveted to the cap plate 151. In an implementation, the first terminal bolt 122 may be coupled with the first terminal nut 123, and the upper end of the first terminal bolt 122 may then be riveted to then be fixed to the cap plate 151. For example, riveting may drive upper sidewalls of the first terminal bolt 122 outwards. Once the first terminal bolt 122 is riveted, a depth of the rivet recess 122c may be further increased. Once the first terminal bolt 122 is riveted, an extension part 122d may be formed at the outer circumference of the rivet recess 122c. The extension part 122d may be coupled to a receiving part 123b, e.g., an angled face, of the first terminal nut 123, thereby preventing the first terminal nut 123 from being disengaged from the first terminal bolt 122.

The upper part of the first terminal bolt 122 may be plated with, e.g., nickel. For example, a portion of the first terminal bolt 122 having the thread 122a may be plated with nickel to prevent corrosion in the case that the first terminal bolt 122 is made of copper.

The first terminal nut 123 may be engaged with the first terminal bolt 122. A thread 123a may be formed on the inner surface of the first terminal nut 123, and may be fastened with the thread 122a formed on the first terminal bolt 122 to then fix the first terminal bolt 122 to the cap plate 151. The receiving part 123b may be formed at an interior upper part of the first terminal nut 123. The receiving part 123b may be coupled to the extension part 122d formed when the first terminal bolt 122 is riveted to prevent the first terminal nut 123 from being disengaged from the first terminal bolt 122.

The first terminal nut 123 may be made of aluminum. Thus, an external bus bar may be easily coupled to the first terminal nut 123. The first terminal nut 123 may be formed in, e.g., a hexahedral shape or circular shape.

As described above, the first electrode terminal 120 may have parts made of different materials. For example, the first terminal bolt 122 may have the upper part made of nickel-plated copper, and the first terminal nut 123 may be made of aluminum. The first terminal bolt 122 and the first terminal nut 123 may be coupled to each other through bolt-nut engagement. Thus, a separate welding process is not required for the first electrode terminal 120. In addition, after the first terminal bolt 122 and the first terminal nut 123 are coupled to each other, the upper part of the first terminal bolt 122 may be riveted, so that the first electrode terminal 120 is firmly fixed to the cap plate 151.

The first terminal nut 123 may be made of aluminum. Thus, an external bus bar made of aluminum may be easily coupled to the first electrode terminal 120.

The second electrode terminal 130 may be made of a conductive material such as aluminum and may be electrically connected to the second electrode plate 112. The second electrode terminal 130 may include a second collector plate 131, a second terminal bolt 132, and a second terminal nut 133.

The second collector plate 131 may be electrically connected to the second electrode uncoated portion 112a protruding to an end of the electrode assembly 110. The second collector plate 131 may be formed in an inverted 'L' shape, and may have a terminal hole 131a at its upper part. The second terminal bolt 132 may be fitted into the terminal hole 131a to then be engaged with the second collector plate 131. The second terminal bolt 132 may pass through a cap plate 151, which is described below, and may be electrically connected to the second collector plate 131.

The second terminal bolt 132 may include a thread 132a formed on the outer circumferential surface of an upper part of the second terminal bolt 132 shaped as a column. The second terminal bolt 132 may also include a flange 132b formed at a lower part of the columnar-shaped second electrode terminal 132, positioned below the cap plate 151, so as to prevent the second terminal bolt 132 from being disengaged from the cap plate 151. A portion of the second terminal bolt 132 positioned lower than the flange 132b may be fitted into the second terminal hole 131a of the second collector plate 130. The second terminal bolt 132 may be electrically connected to the cap plate 151.

Referring to FIGS. 4A and 4B, a rivet recess 132c may be formed at an upper end of the second terminal bolt 132 to allow the second terminal bolt 132 to be riveted and firmly fixed to the cap plate 151. For example, the second terminal bolt 132 may be coupled with the second terminal nut 133, and the upper end of the second terminal bolt 132 may then be riveted to then be fixed to the cap plate 151. Once the second terminal bolt 132 is riveted, a depth of the rivet recess 132c may be further increased, and an extension part 132d may be formed at the outer circumference of the rivet recess 132c. The extension part 132d may be coupled to a receiving part 133b of the second terminal nut 133, e.g., an internal angled portion thereof, to prevent the second terminal nut 133 from being disengaged from the second terminal bolt 132.

The second terminal nut 133 may be engaged with the second terminal bolt 132. A thread 133a may be formed on the inner surface of the second terminal nut 133. The thread 133a formed on the inner surface of the second terminal nut 133 may be fastened with the thread 132a formed on the second terminal bolt 132 to then fix the second terminal bolt 132 to the cap plate 151. In addition, the receiving part 133b may be formed at an interior upper part of the second terminal nut 133. The receiving part 133b may be coupled to the extension part 132d formed when the second terminal bolt 132 is riveted to prevent the second terminal nut 133 from being disengaged from the second terminal bolt 132.

The second terminal nut 133 may be made of aluminum. Thus, an external bus bar may be easily coupled to the second terminal nut 133. The second terminal nut 133 may be formed in, e.g., a hexahedral shape or circular shape.

As described above, the second terminal bolt 132 and the second terminal nut 133 may be coupled to each other through bolt-nut engagement. Thus, a separate welding process is not required for the second electrode terminal 130. In addition, after the second terminal bolt 132 and the second terminal nut 133 are coupled to each other, the upper part of the second terminal bolt 132 may be riveted, so that the second electrode terminal 130 is firmly fixed to the cap plate 151. Further, the second terminal nut 133 may be made of aluminum. Thus, an external bus bar made of aluminum may be easily coupled to the second electrode terminal 130.

The case 140 may be made of, e.g., a conductive metal such as aluminum, aluminum alloy or nickel plated steel. The case 140 may have a substantially hexahedral shape, e.g., a box having an opening in which the electrode assembly 110, the first electrode terminal 120, and the second electrode terminal 130 are inserted and seated. Although FIG. 2 illustrates a state in which the case 140 and the cap assembly 150 are combined with each other and the opening is not illustrated, the peripheral portion of the cap assembly 150 may substantially correspond to the opening. Meanwhile, the inner surface of the case 140 may be processed by insulation treatment, so as to be insulated from the electrode assembly 110, the first electrode terminal 120, the second electrode terminal 130, and the cap assembly 150. The case 140 may function as an electrode having a polarity, for example, a positive electrode.

The cap assembly 150 may be coupled to the case 140. In an implementation, the cap assembly 150 may include a cap plate 151, a gasket 152, a plug 153, a vent plate 154, a connection plate 155, an upper insulation member 156, an inversion plate 157, a short-circuit plate 158, and a lower member 159.

The cap plate 151 may seal the opening of the case 140 and may be made of the same material as the case 140. The cap plate 151 may have the same polarity as the case 140.

The gasket 152, which may be made of an insulating material, may be interposed between each of the first terminal bolt 122 and the second terminal bolt 132 and the cap plate 151, and may hermetically seal regions between each of the first terminal bolt 122 and the second terminal bolt 132 and the cap plate 151. The gasket 152 may prevent external moisture from infiltrating into the rechargeable battery 100 and/or prevent the electrolyte solution contained in the rechargeable battery 100 from leaking to the outside of the rechargeable battery 100.

The plug 153 may plug up an electrolyte injection hole 151a of the cap plate 151. The vent plate 154 may be located in the vent hole 151b of the cap plate 151 and may include a notch 154a configured to be opened at a predetermined pressure.

The connection plate 155 may be formed such that the second terminal bolt 132 is inserted between the second terminal bolt 132 and the cap plate 151, and may closely contact the second terminal bolt 132 and the gasket 152 through the second terminal nut 133. The connection plate 155 may electrically connect the second terminal bolt 132 and the cap plate 151 to each other.

The upper insulation member 156 may be formed such that the first terminal bolt 122 is inserted into a space between the first terminal bolt 122 and the cap plate 151 and closely contacts the cap plate 151 and the gasket 152. The upper insulation member 156 may insulate the first terminal bolt 122 from the cap plate 151.

In the short-circuit hole 151c of the cap plate 151, the inversion plate 157 may be disposed between the upper insulation member 156 and the cap plate 151. The inversion plate 157 may have a rounded portion that is downwardly convex, and an edge portion fixed to the cap plate 151. The inversion plate 157 may be inverted to be upwardly convex when the internal pressure of the rechargeable battery 100 exceeds a predetermined pressure, e.g., pressure due to over-charge of the rechargeable battery 100. The inversion plate 157 may have the same polarity as the cap plate 151.

The short-circuit plate 158 may be formed such that the second terminal bolt 122 is inserted from an exterior side, may be spaced apart from the cap plate 151, e.g., on the upper insulation member 156, and may extend to cover the short-circuit hole 151c. The short-circuit plate 158 may be electrically connected to the second terminal bolt 122. The short-circuit plate 158 may be configured to come into contact when the inversion plate 157 convexly protrudes upwardly when the internal pressure of the rechargeable battery 100 exceeds the predetermined pressure, e.g., pressure due to over-charge of the rechargeable battery 100, the contact causing an electrical short-circuit to the rechargeable battery 100.

The lower insulation member 159 may be formed between each of the first collector plate 121 and the second collector plate 131 and the cap plate 151 to prevent undesired electrical short-circuits.

The rechargeable battery 100 according to the embodiment described above may include the first terminal bolt 122 having the rivet recess 122c formed at the upper end thereof, and the upper end of the first terminal bolt 122 may be riveted to the cap plate 151 after the first terminal nut 123 is engaged with the first terminal bolt 122 to firmly fix the first electrode terminal 120 to the cap plate 151. In addition, the rechargeable battery 100 according to the embodiment described above may include the first electrode terminal 120 having the first electrode terminal bolt 122 and the first terminal nut 123, and a separate welding process may not be required for the first electrode terminal 120, thereby improving the reliability of the first electrode terminal 120. Further, the rechargeable battery 100 according to the embodiment described above may include the first electrode terminal 120 having the first electrode terminal bolt 122 made of copper and the first terminal nut 123 made of aluminum, thereby allowing an external bus-bar to be coupled to the first electrode terminal 120.

Generally, a secondary battery may be formed such that an electrode assembly, formed by disposing a separator as an insulator between positive and negative electrode plates, and an electrolyte are accommodated in a case, and a cap assembly having electrode terminals may be provided to close the case. Such a rechargeable battery may employ two materials of aluminum (Al) and copper (Cu) to a negative electrode terminal to be coupled with an external bus-bar. Such a negative electrode terminal may experience fracture due to internal/external pressure.

There is a need for a rechargeable battery which is capable of improving the reliability of an electrode terminal while capable of coupling an external bus bar to the electrode terminal. As described above, a rechargeable battery according to an embodiment may be capable of coupling to an external bus bar and improving reliability of an electrode terminal. The rechargeable battery may include an electrode assembly including a first electrode plate, a second electrode plate, and a separator interposed between the first electrode plate and the second electrode plate, a case in which the electrode assembly is received, a cap plate hermetically sealing the case, and a first electrode terminal electrically connected to the first electrode plate, wherein the first electrode terminal includes a first collector plate, a first terminal bolt electrically connected to the first collector plate and passing through the cap plate, and a first terminal nut engaged with the first terminal bolt so as to be riveted.

As described above, the rechargeable battery according to an embodiment may include a first electrode bolt having a rivet groove at its top end, so as to firmly fix a first electrode terminal to a cap plate by engaging a first electrode nut to the first electrode bolt and riveting the top end of the first electrode bolt. The rechargeable battery may include a first electrode terminal having a first electrode terminal bolt and a first electrode terminal. Thus, a separate welding process is not required for the first electrode terminal and the reliability of the first electrode terminal may be improved. In addition, the rechargeable battery may include a first electrode terminal having a first electrode terminal bolt made of copper and a first terminal nut made of aluminum. Thus, an external bus-bar may be easily coupled to the first electrode terminal.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A rechargeable battery, comprising:
an electrode assembly, the electrode assembly including a first electrode plate, a second electrode plate, and a separator interposed between the first electrode plate and the second electrode plate;
a first collector plate;
a case in which the electrode assembly is received;
a cap plate sealing the case;
a first electrode terminal electrically connected to the first electrode plate, the first electrode terminal including a first terminal bolt electrically connected to the first collector plate and passing through the cap plate, the first terminal bolt including a thread on an outer circumferential surface thereof; and
a first terminal nut, the first terminal nut including a thread on an inner surface thereof, the thread of the first terminal nut being engaged with the thread on the first terminal bolt, the first terminal nut also being engaged with the first terminal bolt so as to be riveted thereto, and
further comprising:
a second collector plate;
a second electrode terminal electrically connected to the second electrode plate, the second electrode terminal including a second terminal bolt electrically connected to the second collector plate and passing through the cap plate, the second terminal bolt including a thread on an outer circumferential surface thereof;
a connection plate between the second terminal bolt and the cap plate, the connection plate directly contacting the second terminal bolt; and
a second terminal nut, the second terminal nut including a thread on an inner surface thereof, the thread of the second terminal nut being engaged with the thread on the second terminal bolt, the second terminal nut also being engaged with the first terminal bolt so as to be riveted thereto.

2. The rechargeable battery as claimed in claim 1, wherein the first terminal bolt is made of copper.

3. The rechargeable battery as claimed in claim 1, wherein an upper part of the first terminal bolt has a nickel coating.

4. The rechargeable battery as claimed in claim 1, wherein the first terminal bolt includes a rivet recess at a top end thereof.

5. The rechargeable battery as claimed in claim 4, wherein the first terminal bolt includes an extension part at an outer circumference of the rivet recess.

6. The rechargeable battery as claimed in claim 5, wherein the first terminal nut includes a receiving part at an interior upper part thereof, the extension part of the first terminal bolt being coupled to the receiving part.

7. The rechargeable battery as claimed in claim 1, wherein the first terminal nut is made of aluminum.

8. The rechargeable battery as claimed in claim 1, wherein the second terminal bolt is made of aluminum.

9. The rechargeable battery as claimed in claim 1, wherein the second terminal bolt includes a rivet recess at a top end thereof.

10. The rechargeable battery as claimed in claim 9, wherein the second terminal bolt includes an extension part at an outer circumference of the rivet recess.

11. The rechargeable battery as claimed in claim 10, wherein the second terminal nut includes a receiving part at an interior upper part thereof, the extension part of the second terminal bolt being coupled to the receiving part.

12. The rechargeable battery as claimed in claim 1, wherein the second terminal nut is made of aluminum.

13. The rechargeable battery as claimed in claim 1, further comprising a first gasket between the first terminal bolt and the cap plate and a second gasket between the second terminal bolt and the cap plate.

\* \* \* \* \*